United States Patent [19]

Kohara et al.

[11] Patent Number: 5,124,169
[45] Date of Patent: Jun. 23, 1992

[54] PROCESS FOR PREPARING A LAYERED HYDROGEL PRODUCT

[75] Inventors: Saburo Kohara, Hyogo; Naoko Fujimoto, Kyoto; Shiro Oohashi, Osaka; Hiroki Iida, Kyoto, all of Japan

[73] Assignee: San-Ei Chemical Industries, Ltd., Osaka, Japan

[21] Appl. No.: 550,041

[22] Filed: Jul. 9, 1990

[51] Int. Cl.$^5$ .................... A23L 1/05; A23L 1/054
[52] U.S. Cl. .................... 426/573; 426/89; 426/564
[58] Field of Search .............. 426/573, 575, 576, 577, 426/564, 89

[56] References Cited

FOREIGN PATENT DOCUMENTS

| 0189321 | 7/1986 | European Pat. Off. | 426/576 |
|---|---|---|---|
| 0165745 | 9/1983 | Japan | 426/576 |
| 0113857 | 6/1984 | Japan | 426/577 |
| 0248147 | 12/1985 | Japan | 426/576 |
| 1111659 | 5/1986 | Japan | 426/577 |
| 112846 | 6/1986 | Japan | 426/573 |
| 1-124356 | 5/1989 | Japan | 426/577 |

OTHER PUBLICATIONS

English language translation of JP 58-165,745.
North East Wales Institute of Higher Education Book of Abstracts, Gums and Stabilisers for the Food Industry, The Fifth International Conference; Jul. 10-Jul. 14, 1989, Cartreffle, Wrexham, UK, missing pp. 60-62.
"Simultaneous Filling Layered Dessert Gel with Food Hydrocolloids," in *Gums and Stabilizers for the Food Industry* 5 (Jul., 1989), pp. 579-580.

*Primary Examiner*—Jeanette Hunter
*Attorney, Agent, or Firm*—Sandler, Greenblum, & Bernstein

[57] ABSTRACT

Process for preparing a layered hydrogel product is provided by separately or simultaneously pouring into a mold of a desired shape an aqueous solution (I) containing at least one gelling agent, and an aqueous solution (II) containing xanthan gum and at least one thickening agent including locust bean gum, tara gum, cassia gum and glucomannan, and cooling the resulting material to give a layered hydrogen product.

10 Claims, No Drawings

PROCESS FOR PREPARING A LAYERED HYDROGEL PRODUCT

BACKGROUND OF THE INVENTION

1. Field of the Invention

The present invention relates to a process for preparing a layered hydrogel product, which is industrially advantageous and utilizable for confectionary industry.

2. Discussion of Background and Material Information

Conventionally, a layered hydrogel product has been prepared in the following manners:

(i) A gelling agent which is gelled by cooling, such as agar, gelatin or the like (hereinafter called as known gelling agent), is dissolved in water, then the aqueous solution is cooled to a temperature below its gelation temperature. On the gelled solution, is laminated an aqueous solution of the same or another gelling agent, such as carrageenan, pectin, gellan gum or the like, which is maintained at a temperature higher than its gelation temperature, then cooled to give a layered hydrogel product.

(ii) Specific gravities of two solutions containing gelling agents are made different by increasing or decreasing their water-soluble solid contents, then the two solutions in sol state are laminated and cooled to give a layered hydrogel product.

Neither of these processes are industrially advantageous. Namely, the method (i) requires the gelation of the first aqueous solution of a gelling agent by cooling to a temperature below its gelation temperature, to laminate the second solution on the first solution and to again cool the combined product, with the result that energy loss in the cooling steps becomes considerably high and the process becomes complicated. Further, in this method (i), the two layers tend to be detached from each other at the interface. In the method (ii), although the specific gravities of the two solutions are made different, tastes, colors, fragrances and the like contained in each of the solutions are mixed when the two solutions are poured into a mold, so that the value of the product is significantly degraded. Further, the pouring operation must be carefully and slowly conducted, resulting in a disadvantageous industrial application.

SUMMARY OF THE INVENTION

Accordingly, an object of the invention is to solve the above-mentioned problems of the prior art methods.

Another object of the invention is to provide an industrially advantageous process for preparing a layered hydrogel product.

Thus, the present invention provides a process for preparing a layered hydrogel product, which comprises pouring into a mold of a desired shape an aqueous solution (I) containing at least one gelling agent, and an aqueous solution (II) containing xanthan gum and at least one thickening agent selected from a group of locust bean gum, tara gum, cassia gum and glucomannan and cooling the resulting material to give a layered hydrogel product. The solutions may be agitated prior to pouring to form what is referred to as "whipping solution".

In the present invention, a mold of a desired shape is meant by a mold, cup or vessel of any shape for confectionery, such as truncated cone, circular cylinder, rectangular parallelopiped, elliptic cylinder or the like, and its volume is not specifically limited.

The term "pouring" as used above is meant by an operation of pouring either one of the aqueous solution (I) or its whipping solution and the solution (II) or its whipping solution into the mold, followed by pouring the remaining solution. Even if both of the solutions (I) and (II) or their whipping solutions are simultaneously poured into the mold, they unexpectedly become a clearly separated and layered hydrogel product when cooled. Therefore, the solutions form a layered hydrogel product provided that they are not stirred by force.

DETAILED DESCRIPTION OF THE PREFERRED EMBODIMENT

According to the invention, an aqueous solution of a known gelling agent such as carrageenan, agar, gelatin, low methoxyl pectin, gellan gum, alginic acid or the like is heated and maintained at a temperature higher than its gelation temperature (usually higher than 50° C.). To the above solution is added an aqueous solution of a blend of xanthan gum and at least one thickening agent such as locust bean gum, tara gum, cassia gum and glucomannan which is heated and maintained at a temperature higher than its gelation temperature (usually higher than 60° C.). Each of the above solutions can be used in whipped state before pouring. The above steps can be carried out in reverse order; namely, the solution of a known gelling agent can be added to the solution containing xanthan gum. Moreover, the two solutions or their whipping solutions may be simultaneously poured. The poured solutions are then cooled to form a layered hydrogel product. The two layers of the resulting layered gel product are clearly cut and separated without mixing their tastes, colors, fragrance and the like, and will not be detached from each other even if they are cut with a knife or mechanically given a shock.

The above two solutions may be the same or different in specific gravity or brix, acidity or alkalinity and so forth. Either or both of the solutions may contain fruit juices (e.g., orange, apple, grape, pear, strawberry, peach or the like) or their essence, e.g., flavored solution thereof, coffee, tea extract, wine, milk or its processed product, flavors, sweetening agents (e.g., sugar, fructose or the like) and so forth.

The gelling agent can be used in an amount sufficient to give a gelation, e.g., 0.2 to 2% (w/w). The total amount of xanthan gum and the thickening agent is used in an amount sufficient to cause gelation, e.g., 0.2 to 2 (w/w). A ratio of xanthan gum to the thickening agent is not specifically limited but preferably 2:1 to 1:2. A ratio of at least one of tara gum, cassia gum and glucomannan to the blend of xanthan gum and locust bean gum may be any desired ratio, for example, 1:1 to 0.1:1. As well, a ratio of at least one of tara gum, cassia gum and glucomannan to xanthan gum is not specifically limited.

An amount of the above thickening agent may vary depending on the target gelation degree of the product and texture thereof. Generally, however, it may be within the range from 0.2 to 2 wt % with respect to the total weight of the raw materials to be used. Besides, when the solution contains 0.25% (w/w) or more of the blend of xanthan gum and e.g., locust bean gum in 1:1 ratio, it may also contain a gelling agent in order to improve a taste of the layered product.

The gelling agents used in the invention may decrease in their gelation degree in the acid side, therefore, addition of a buffering agent, such as sodium citrate, sodium phosphate, polyphosphate or the like can prevent decrease in gelation degree. An amount of the buffering agent to be used is desirably 0.05 to 0.3 wt %.

The layered hydrogel products of the invention may be two, three, four or more layered products.

Hereinafter, the present invention will be more fully described with reference to Test Examples and Examples which are merely examples and not limitative to the invention.

TEST EXAMPLE 1

Xanthan gum (5 g) and locust bean gum (5 g) were added to water (990 g) under stirring. The gums were dissolved in a hot water bath under stirring until a temperature of the mixture was raised to 80° C. to give an aqueous solution (A) which was maintained at 70° C.

Xanthan gum (5 g) and tara gum (3 g) were added to water (992 g) under stirring. The gums were dissolved in a hot water bath under stirring until a temperature of the mixture was raised to 80° C. to give an aqueous solution (B) which was maintained at 70° C.

Agar (6 g) was added to water (994 g) under stirring, then the mixture was stirred in a hot water bath until its temperature was raised to 95° C. to give an aqueous solution (C) which was maintained at 40° C.

Gelatin (20 g) was added to water (980 g) under stirring, then the mixture was stirred in a hot bath until its temperature was raised to 80° C. to give an aqueous solution (D) which was maintained at 30° C.

Carrageenan (12 g) was added to water (988 g) under stirring, then the mixture was stirred in a hot bath until its temperature was raised to 80° C. to give an aqueous solution (E) which was maintained at 50° C.

Carrageenan (6 g) and locust bean gum (4 g) were added to water (990 g) under stirring, then the mixture was stirred in a hot water bath until its temperature was raised to 80° C. to give an aqueous solution (F) which was maintained at 70° C.

Low methoxyl pectin (10 g) was added to water (984 g) under stirring, then the mixture was stirred in a hot bath until its temperature was raised to 80° C. To the mixture further added were citric acid (3 g) and calcium lactate (3 g) to give an aqueous solution (G) which was maintained at 80° C.

Kelco-gel (2 g, manufactured by Kelco Co.) was added to water (997 g) under stirring, then the mixture was stirred in a hot bath until its temperature was raised to 90° C. To the mixture further added was calcium lactate (1 g) to give an aqueous solution (H) which was maintained at 80° C.

Xanthan gum (6 g), locust bean gum (4 g) and cassia gum (2 g) were added to water (988 g) under stirring. They were dissolved in the water in a hot bath under stirring until a temperature of the mixture was raised to 80° C. to give an aqueous solution (I) which was then maintained at 70° C.

Next, combinations of two, three and four of the above solutions respectively maintained at their proper temperatures were each (50 ml) poured into a cylindrical cup (diameter: 6.3 cm, height: 5.3 cm, internal volume: 115 ml). These were cooled for 6 hours at 5° C. in a refrigerator. The results thereof are shown in the following Table 1. As can be seen from the results of the various combinations of solutions in Table 1, the capability of the process to obtain a layered gel product having clearly separated layers does not depend upon the gelation temperatures of the solutions. In other words, the gelation temperatures of the solutions utilized in the process are independent of each other.

TABLE 1

| Test Sample | Resulting Layered Gel Product |
| --- | --- |
| A + A | mixed, irregular layers |
| A + B | mixed, irregular layers |
| A + C | not mixed, clearly separated layers |
| A + D | not mixed, clearly separated layers |
| A + E | not mixed, clearly separated layers |
| A + F | not mixed, clearly separated layers |
| A + G | not mixed, clearly separated layers |
| A + H | not mixed, clearly separated layers |
| A + I | mixed, irregular layers |
| A + C + A | not mixed, clearly separated layers |
| A + C + A + D | not mixed, clearly separated layers |
| B + B | mixed, irregular layers |
| B + C | not mixed, clearly separated layers |
| B + D | not mixed, clearly separated layers |
| B + E | not mixed, clearly separated layers |
| B + F | not mixed, clearly separated layers |
| B + G | not mixed, clearly separated layers |
| B + H | not mixed, clearly separated layers |
| B + I | mixed, irregular layers |
| B + F + B | not mixed, clearly separated layers |
| B + G + B + F | not mixed, clearly separated layers |
| C + C | mixed, irregular layers |
| C + D | mixed, irregular layers |
| C + E | mixed, irregular layers |
| C + F | mixed, irregular layers |
| C + G | mixed, irregular layers |
| C + H | mixed, irregular layers |
| C + I | not mixed, clearly separated layers |
| D + D | mixed, irregular layers |
| D + E | mixed, irregular layers |
| D + F | mixed, irregular layers |
| D + G | mixed, irregular layers |
| D + H | mixed, irregular layers |
| D + I | not mixed, clearly separated layers |
| E + E | mixed, irregular layers |
| E + F | mixed, irregular layers |
| E + G | mixed, irregular layers |
| E + H | mixed, irregular layers |
| E + I | not mixed, clearly separated layers |
| F + F | mixed, irregular layers |
| F + G | mixed, irregular layers |
| F + I | not mixed, clearly separated layers |
| G + G | mixed, irregular layers |
| G + I | not mixed, clearly separated layers |
| H + H | mixed, irregular layers |
| H + I | not mixed, clearly separated layers |
| I + I | mixed, irregular layers |

EXAMPLE 1

Carrageenan (10 g) was added to water (890 g) under stirring with 2000 revolutions per minute. The mixture was then stirred in a hot bath until its temperature was raised to 80° C. and added with orange juice (100 g). The resulting mixture (60 ml) was poured into a cylindrical cup (diameter: 6.3 cm, height: 5.3 cm, internal volume: 115 ml) and maintained at a temperature higher than its gelation temperature. On the other side, xanthan gum (7 g) and cassia gum (3 g) were added to water (790 g) under stirring with 1500 revolutions per minute. The mixture was then stirred in a hot bath until its temperature was raised to 80° C. and added with apple juice (200 g). The resulting mixture was maintained at a temperature higher than its gelation temperature, 40 ml of which was poured onto the previously poured mixture. The combination of the two mixtures in the cylindrical cup was cooled at 7° C. for 10 hours in a refrigerator. The resulting hydrogel product had two layers which were not mixed and were clearly separated.

EXAMPLE 2

Gelatin (20 g) and grape juice (50 g) were added to water (930 g) under stirring with 1000 revolutions per minute. The mixture was then stirred in a hot bath until its temperature was raised to 70° C., 50 ml of which was poured into a cylindrical cup (diameter: 6.3 cm, height: 5.3 cm, internal volume: 115 ml) and maintained at a temperature higher than its gelation temperature. On the other side, xanthan gum (4 g), tara gum (5 g) and orange juice (80 g) were added to water (911 g) under stirring with 1500 revolutions per minute, which was then stirred in a hot bath until a temperature of the mixture was raised to 80° C. The resulting mixture was then maintained at a temperature higher than its gelation temperature, 50 ml of which was poured onto the previously poured mixture. The combination of the two mixtures in the cylindrical cup was cooled at 7° C. for 10 hours in a refrigerator. The resulting hydrogel product had two layers which were not mixed and were clearly separated.

EXAMPLE 3

Agar (7 g) was added to water (933 g) under stirring with 1500 revolutions per minute. The mixture was then stirred in a hot bath until its temperature was raised to 95° C. and added with apple juice (60 g), 60 ml of which was poured into a cylindrical cup (diameter: 6.3 cm, height: 5.3 cm, internal volume: 115 ml) and maintained at a temperature higher than its gelation temperature. On the other side, xanthan gum (5 g), locust bean gum (3 g) were added to water (892 g) under stirring with 1000 revolutions per minute. The mixture was then stirred in a hot bath until its temperature was raised to 85° C. and added with grape fruit juice (100 g). The resulting mixture was then maintained at a temperature higher than its gelation temperature, 40 ml of which was poured onto the previously poured mixture. The combination of the two mixtures in the cylindrical cup was cooled at 5° C. for 8 hours in a refrigerator. The resulting hydrogel product had two layers which were not mixed and were clearly separated. The cup containing the layered hydrogel product is sealed and stationarily sterilized at 85° C. for 30 minutes.

As seen above, according to the invention, an ideal layered hydrogel product can be advantageously prepared without complex operations.

What is claimed is:

1. A process for preparing a layered hydrogel product, comprising:

pouring into a mold of a desired shape at least two aqueous solutions to form a mixture, said solutions being poured into the mold in any order;

one of said at least two aqueous solutions containing at least one gelling agent, and another of said at least two aqueous solutions containing xanthan gum and at least one thickening agent selected from the group consisting of locust bean gum, tara gum, cassia gum and glucomannan;

said at least two aqueous solutions being poured at a temperature above their gelation temperatures, with the gelation temperature for each of said at least two aqueous solutions being independent of each other; and cooling the mixture to obtain a layered hydrogel product.

2. The process according to claim 1, wherein the gelling agent is selected from the group consisting of carrageenan, agar, gelatin, low methoxyl pectin, gellan gum, alginic acid, and mixtures thereof.

3. The process according to claim 1, wherein each of said at least two aqueous solutions have substantially the same specific gravity.

4. The process according to claim 1, wherein said at least two aqueous solutions comprises two aqueous solutions, and the two aqueous solutions have substantially the same specific gravity.

5. The process according to claim 1, wherein at least one of said at least two aqueous solutions contains fruit juice or an essence thereof.

6. The process according to claim 1, wherein said at least two aqueous solutions comprise at least three aqueous solutions.

7. The process according to claim 6, wherein said at least three aqueous solutions comprise at least one aqueous solution containing xanthan gum and the at least one thickening agent.

8. The process according to claim 6, wherein said at least three aqueous solutions comprise at least two aqueous solutions containing xanthan gum and the at least one thickening agent.

9. The process according to claim 1, wherein said one of said at least two aqueous solutions contains an effective amount of said at least one gelling agent to obtain gelation, and said another of said at least two aqueous solutions contains an effective amount of said xanthan gum and at least one thickening agent to obtain gelation.

10. The process according to claim 1, wherein the weight ratio of xanthan gum to the at least one thickening agent is 2:1 to 1:2.

* * * * *

UNITED STATES PATENT AND TRADEMARK OFFICE
CERTIFICATE OF CORRECTION

PATENT NO. : 5,124,169
DATED : June 23, 1992
INVENTOR(S) : S. KOHARA et al.

It is certified that error appears in the above-indentified patent and that said Letters Patent is hereby corrected as shown below:

On the cover, in item [75], Inventors, line 3, delete "Hiroki Iida, Kyoto".

On the cover, in item [56], Foreign Patent Documents, 6th listed reference change "112846" to ---1128846---.

On the cover, in item [57], Abstract, line 9, change "hydrogen" to ---hydrogel---.

At column 3, line 2 of the printed patent, after "like" insert ---,--- .

Signed and Sealed this

Ninth Day of January, 1996

Attest:

BRUCE LEHMAN

*Attesting Officer*     *Commissioner of Patents and Trademarks*